UNITED STATES PATENT OFFICE.

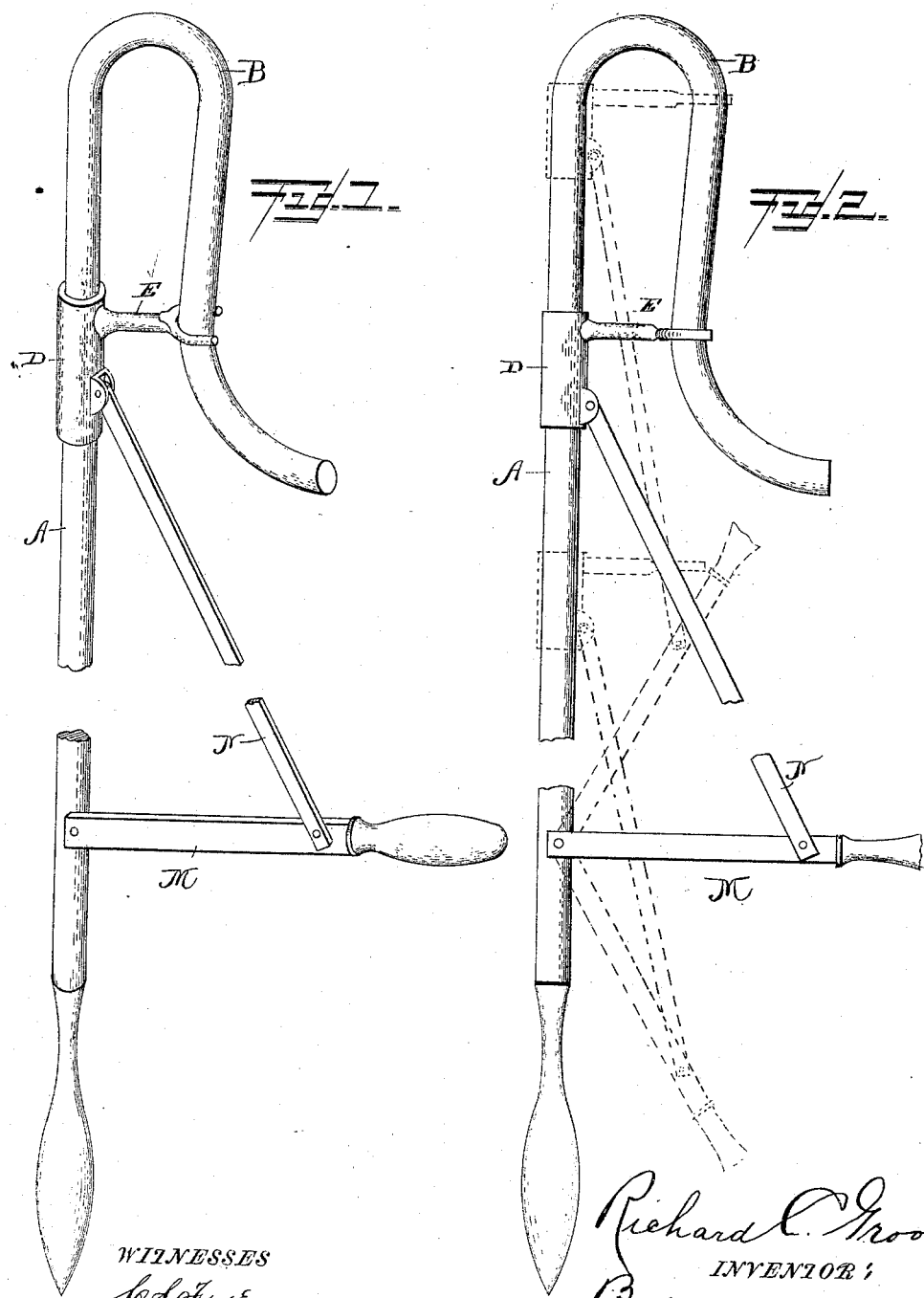

RICHARD C. GROOM, OF COBB, KENTUCKY.

CATCHING-TOOL.

SPECIFICATION forming part of Letters Patent No. 473,739, dated April 26, 1892.

Application filed September 5, 1891. Serial No. 404,913. (No model.)

*To all whom it may concern:*

Be it known that I, RICHARD C. GROOM, a citizen of the United States, residing at Cobb, in the county of Caldwell and State of Kentucky, have invented certain new and useful Improvements in Animal-Catchers; and I do hereby declare the following to be a full, clear, and exact description of the invention, such as will enable others skilled in the art to which it appertains to make and use the same.

My invention relates to improvements in tools for catching and holding domestic animals and fowls; and it consists in the provision of a rigid hook upon one end of a rod, a securing-arm carried by an adjustable sleeve mounted on the rod and adapted to engage the hook and close the mouth of the same to secure the leg or legs of an animal or fowl therein, and a suitable means for adjusting said arm to and fro upon the main rod, as hereinafter described and claimed.

In the accompanying drawings, Figure 1 is a perspective view of my improved tool, and Fig. 2 is a side elevation of the same with parts illustrated in their adjusted positions by dotted lines.

Referring by letter to said drawings, A indicates the main rod of my improved tool, which is of any suitable length and is bent at its forward end into the hook B, which is preferably curved away from the main rod, as shown, so as to afford the flaring mouth, whereby the leg of an animal or fowl may be engaged without injury thereto.

Loosely mounted upon the main rod A is a sleeve D, from which extends the lateral securing-arm E, which is preferably formed integral with said sleeve, although it might be rigidly secured thereto, if desirable. This arm E, as better illustrated in Fig. 1 of the drawings, has its free end furcated to engage and straddle the hook B, and by adjusting said arm, as illustrated by dotted lines in Fig. 2, it will be readily perceived that the leg or legs of an animal or fowl may be securely held in the hook without scratching or otherwise injuring the same.

Pivotally or flexibly connected at one end to the main rod A, adjacent to the handle end thereof, is a hand-lever M, which is connected by a link N with the sleeve D, whereby it will be readily perceived that the said sleeve and the securing-arm carried thereby may be adjusted with respect to the hook by the operator at a distance from the animal or fowl to be caught.

Although I prefer to employ the lever M and the intermediate link for adjusting the sleeve and securing-arm, yet I do not desire to be confined to such means for adjusting said sleeve and arm, as any suitable means might be employed.

By the construction described it will be readily perceived that I have provided an animal-catcher of an exceedingly cheap and simple construction, embodying but two essential parts, viz: the rod bent into a hook at one end and the arm adjustably connected to said rod.

Having thus described my invention, what I claim, and desire to secure by Letters Patent, is—

In a tool for catching and holding animals and fowls, the combination, with the main rod bent into a hook at one end, of the adjustable sleeve loosely mounted on the main rod, the lateral securing-arm carried by the adjustable sleeve and having its free end forked, and a suitable means for adjusting said sleeve and arm, substantially as specified.

In testimony whereof I affix my signature in presence of two witnesses.

RICHARD C. GROOM.

Witnesses:
CHAS. L. GROOM,
E. A. MITCHELL.